Figure 1:
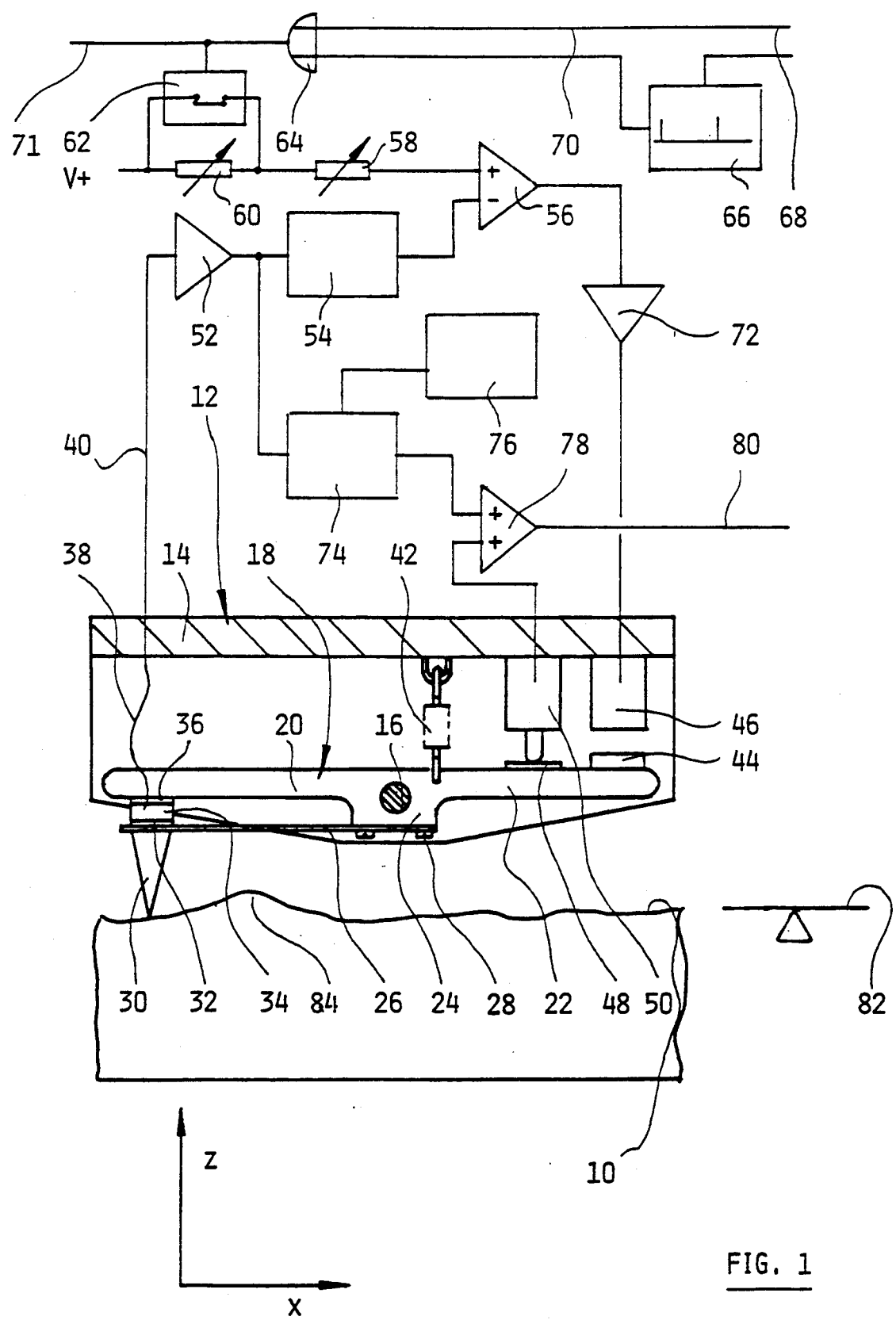

United States Patent [19]

Breitmeier

[11] Patent Number: 5,146,690
[45] Date of Patent: Sep. 15, 1992

[54] SCANNING HEAD

[75] Inventor: Ulrich O. Breitmeier, Ettlingen, Fed. Rep. of Germany

[73] Assignee: Focus Messtechnik GmbH & Co KG, Ettlingen, Fed. Rep. of Germany

[21] Appl. No.: 687,571

[22] Filed: Apr. 19, 1991

[30] Foreign Application Priority Data

Apr. 28, 1990 [DE] Fed. Rep. of Germany ....... 4013742

[51] Int. Cl.⁵ ............................................. G01B 7/28
[52] U.S. Cl. .................................. 33/551; 33/501.03; 33/DIG. 1; 73/105
[58] Field of Search ............... 33/551, 501.02, 501.03, 33/501.04, 545, 546, 549, DIG. 1, 832; 73/105

[56] References Cited

U.S. PATENT DOCUMENTS

| | | | |
|---|---|---|---|
| 2,691,887 | 10/1954 | Rinker | 33/551 |
| 3,714,715 | 2/1973 | Coes, Jr. | 33/546 |
| 4,060,734 | 11/1977 | Tilley et al. | 33/501.03 |
| 4,377,911 | 3/1983 | Iida et al. | 33/551 |
| 4,669,300 | 6/1987 | Hall et al. | 33/551 |

FOREIGN PATENT DOCUMENTS 1248065 9/1971 United Kingdom.
2065892 7/1981 United Kingdom.

Primary Examiner—William A. Cuchlinski, Jr.
Assistant Examiner—C. W. Fulton
Attorney, Agent, or Firm—Fred Philpitt

[57] ABSTRACT

A scanning head (12) for a surface measuring machine has a probe tip (30), which is supported by a probe tip support lever (18) so that it can be deflected perpendicularly to the reference surface (82). Incorporated between the probe tip (30) and a rigid section of the probe tip support lever (18) is a force sensor (34), whereof the output signal serves as an actual value of a control circuit (56 to 60), which controls a magnetic servo motor (44, 46), which exerts a variable additional force, to be added to the force of a tension spring (42), on the probe tip support lever (18), the whole so that the contact pressure of the probe tip (30) is kept constant irrespective of the surface contour.

12 Claims, 2 Drawing Sheets

SCANNING HEAD

The invention relates to a scanning head for an apparatus for measuring the micro-surface contour of work-pieces.

Known scanning heads of this type are used in measuring machines, in which coordinate drives are provided, in order to produce a relative movement between the scanning head and work-piece surface in scanning directions as a rule perpendicular to each other. If the work-piece surface contains steep contour sections, the scanning speed must then be chosen to be relatively low, in order that the probe tip does not lift from the surface of the work-piece due to inertia or does not collide in a hard manner with the latter. For this reason, a use of such measuring machines has hitherto been restricted to measuring individual work-pieces, a complete measurement of mass-produced products not being possible for reasons of time, although it would be desirable for quality control.

Therefore, due to the present invention, a scanning head according to the present invention should be developed so that a work-piece surface can be measured more quickly therewith.

This object is achieved according to the invention by a scanning head according to the present invention.

In the scanning head according to the invention, the probe tip is held with a constant pressure in abutment against the work-piece surface, independently of the local surface contours of the work-piece surface. The rapid readjustment of the contact pressure to the respective desired reference value makes it possible to considerably increase the relative speed between the scanning head and work-piece surface, so that one can measure one hundred per cent of even mass-produced work-pieces in large numbers. The increased expenditure for apparatus is low set against this advantage.

According to another embodiment, the force acting on the probe tip is measured directly in the immediate vicinity of the probe tip and largely free from other influences.

In a scanning head according to another embodiment, one has reliable positioning of the probe tip in both scanning directions, thus against forces lying parallel to the reference plane, whereas at the same time good mobility in the direction perpendicular to the reference plane is guaranteed.

With the development of the invention according to another embodiment it is ensured that no unsteadiness occurs in the force-transmission section from the probe tip to the probe tip support, also the output signal of the force sensor varies continuously in a corresponding manner.

With the development of the invention according to another embodiment it is ensured that the measurement of the instantaneous force acting on the probe tip takes place substantially decoupled from the position measurement, since solid state force sensors are able to measure a large force range with solely a small deformation.

The development of the invention according to another embodiment is an advantage with regard to a simple and reliable signal transmission between the force sensor moved with the probe tip support and the electronic unit as a rule fixed to the housing.

The development of the invention according to another embodiment is an advantage with regard to a mechanically particularly simple construction of the probe tip and probe tip support.

A position indicator, in another embodiment, is characterised by a particularly high limiting frequency. This facilitates particularly rapid scanning of the work-piece surface. Also, a position indicator of this type is an advantage particularly if its output signal is used simultaneously for differentiation of the force acting on the probe tip.

In a scanning head according to another embodiment, one can also use force sensors of the type whereof the driven input member experiences a variation of position which is no longer negligible, at the time of measuring the force and one can also measure those work-piece surfaces in which the material suffers a considerable local deformation under the action of the probe tip. In both cases, in the scanning head according to this embodiment, the working traverse of the force sensor and the penetration depth of the probe tip are taken into consideration automatically on measuring the position.

In this case, with a scanning head according to another embodiment, one can automatically take into consideration different hardnesses of work-piece surfaces to be measured, in a simple manner, by selecting a corresponding force/displacement characteristic for the working traverse of the force sensor or the penetration depth of the probe tip.

If one constructs the servo motor of the scanning head according to another embodiment, then the servo motor has a very simple mechanical construction, in addition it works without friction and may be subject to a fine adjustment in a particularly simple manner and with economic components.

In a scanning head according to another embodiment, one can increase the contact force of the probe tip at predetermined points or at regular intervals of time, in order to ascertain at selected points, the hardness of the work-piece by way of the additional penetration depth of the probe tip.

A scanning head, such as that described in another embodiment, can be used equally well with a positive and negative scanning direction. Thus, for scanning a further line, it does not need to be returned to the zero position in the scanning direction, due to which one achieves a considerable having of time.

Figure 2:
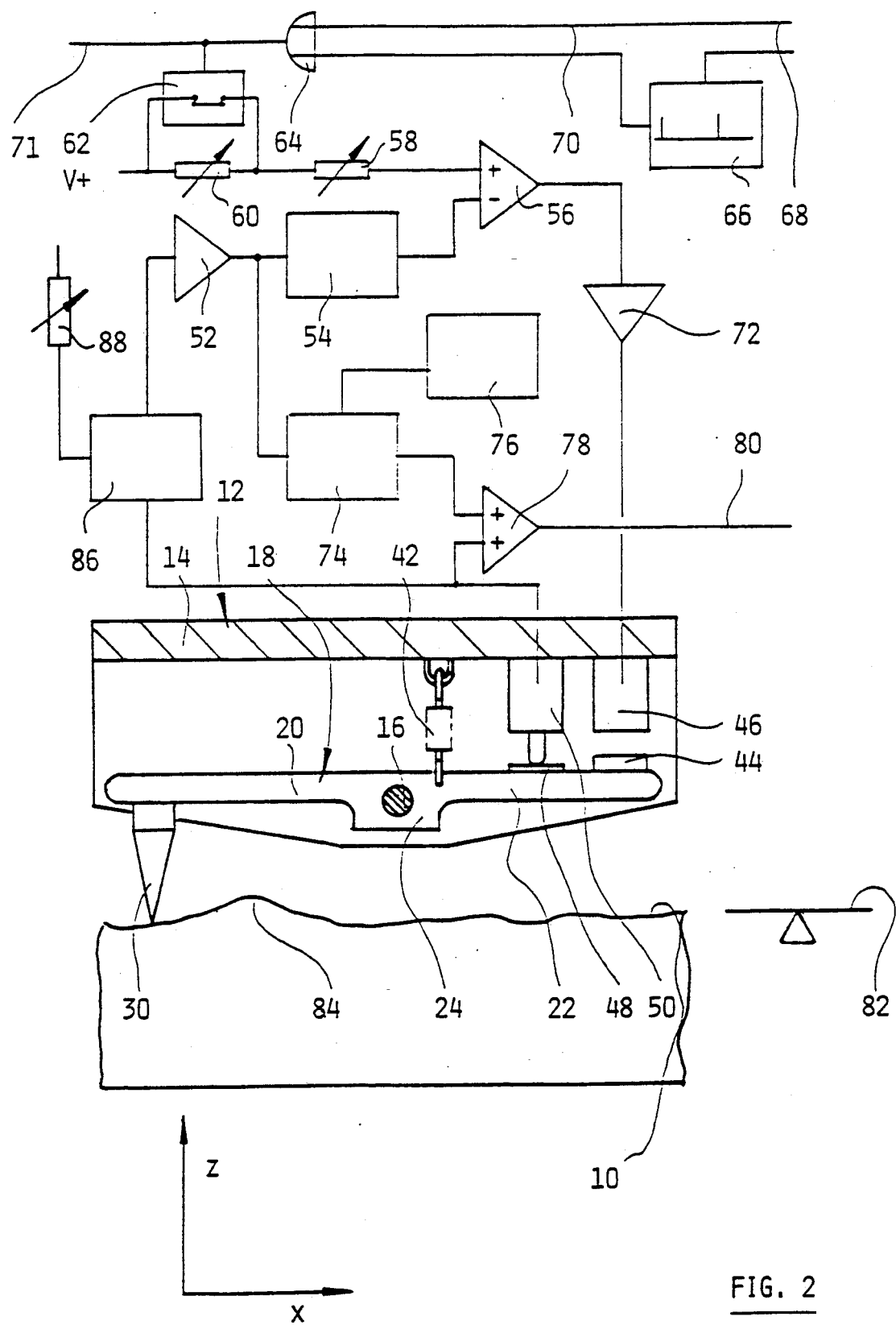

The invention will be described in detail hereafter with reference to embodiments, referring to the drawings, in which:

FIG. 1 is vertical section through a tactile scanning head of a surface measuring machine in conjunction with associated operating electronics; and FIG. 2 is view similar to that of FIG. 1, showing a scanning head having a mechanically simple construction.

In the drawing, a tactile scanning head for the precise measurement of the micro-surface contour of a work-piece surface 10 is designated generally by the reference numeral 12.

The scanning head 12 has a housing 14 of substantially U-shaped cross-section. The sides of the housing 14 support a bearing pin 16, on which a two-armed probe tip support lever 18 is tiltably mounted.

The rectilinear support lever 18 has a support arm 20 and a driving arm 22 aligned therewith. Attached by screws 28 to a central hub section 24 of the support lever 18 is a leaf spring 26 so that it extends parallel below the support arm 20. The free end of the leaf spring 26 supports a probe tip 30 pointing downwards, which cooperates with the work-piece surface 10.

The upper side of the leaf spring 26 presses by way of an insulating plate 32 against a force sensor 34, which in practice may be an inductive, capacitive, optical or piezo-electric force sensor. The upper end face of the force sensor 34 is supported by way of a further insulating plate 36 on the under side of the support arm 20.

The force sensor 34 is connected to a lead 40 integral with the housing, by way of a swung, easily flexible lead 38. The length of the flexible lead 38 is measured so that even when the probe tip 30 is located at the lower end point of its working stroke, it is still bent out of the neutral axis (in the drawing, the support lever 18 is illustrated in the centre of the working stroke).

Engaging on the driving arm 22 of the support lever 18 is a tension spring 42, whereof the second end is fixed to the housing 14. At its end located on the right in the drawing, the driving arm 22 also supports a permanent magnet 44, which cooperates with an opposing magnet coil 46 integral with the housing.

In a central section, a contact plate 48 is welded to the driving arm 22, which plate cooperates with the spherical end of the input member of a position indicator 50 biased resiliently in the outwards direction, which may be for example a differential transformer.

The output signal of the force sensor 34 present on the lead 40 is sent by way of an amplifier 52 to a characteristic circuit 54, which modifies the input signal according to a programmed characteristic, in particular compensates for non-linearities in the force sensor characteristic. The linearised force signal is sent to the one input of a differential amplifier 56, whereof the second input receives a reference value signal associated with the reference contact force for the probe tip 30, which reference value signal can be predetermined for example at two adjustable resistors 58, 60.

The resistor 60 is shunted by a controllable switch 62, in order to be able to switch over the reference value signal between a low normal value (switch 62 closed) and a high hardness checking value (switch 62 temporarily open). This switching-over takes place by way of an OR-gate 64 either in a time-controlled manner by a free-running clock generator 66, which can be switched on and off by way of an external control lead 68, or directly by external control signals, which are made available on a lead 70 by a central control of the measuring machine (not shown in the drawing), in the case of pre-programmed points of the work-piece surface or selection criteria determined depending on the performance, which criteria are used on the measurement results already obtained. The output signal of the OR-gate 64 is made available on an output lead 71, in order to stop the coordinate drives moving the scanning head 12 or the work-piece as long as the higher probe tip contact pressure temporarily produced for checking hardness, is maintained.

A fault signal obtained at the output of the differential amplifier 56 passes to the input of a power amplifier 72, which acts on the magnet coil 46.

The output signal of the amplifier 52 is moreover sent to a second characteristic circuit 74, which contains a plurality of force/displacement characteristics, of which respectively one can be activated by way of a selection unit 76. The characteristics programmed into the characteristic circuit 74 respectively indicate which deformation the force sensor 34 experiences and how deep the probe tip penetrates, in the case of the respective contact force, in that material from which the work-piece surface 10 just measured exists. For these two strain paths, which are contained as fault portions in the output signal of the position indicator 50, the characteristic circuit 74 makes a correction signal available, which is added in an adding circuit 78 to the output signal of the position indicator 50. The corrected position signal is transmitted on a lead 80 to the central control unit of the measuring machine, for further evaluation.

The above-described scanning head operates as follows in a measuring machine:

The work-piece surface 10 is traversed by coarse adjustment devices of the measuring machine (not illustrated in the drawing) so that on average the work-piece surface 10 coincides with a reference surface 82. The scanning of the work-piece surface 10 takes place (with reference to the xyz-coordinate system reproduced in the drawing) in the x-direction, after each x-scanning, the scanning head being moved by a small amount in the y-direction.

As the probe tip 30 moves over elevations 84 of the work-piece surface 10, the force sensor 34 first of all produces an increased output signal in the rising surface section. By way of the differential amplifier 56, this leads to an immediate reduction of the magnetic additional force, which the magnetic servo motor formed by the permanent magnet 44 and the magnet coil 46 exerts in addition to the force of the tension spring 42 on the driving arm 22 of the support lever 18. On the other hand, if the probe tip 30 travels over a surface section sloping downward, then the output signal of the force sensor 34 is reduced and the magnet coil 46 is supplied with a greater current in a corresponding manner, so that as a whole one obtains a greater probe tip contact force.

Due to the above-described regulation, as a whole it is guaranteed that the probe tip 30 travels under a substantially constant contact pressure on the work-piece surface, irrespective of the micro-contours of the work-piece surface. Damage to the work-piece surface by the probe tip are thus likewise precluded as well as lifting of the probe tip, at the time of rapid movement thereof, above the work-piece surface.

If one wishes to measure the hardness at a certain point of the surface, after stopping the coordinate drives by controlling the switch 62, the probe tip contact force is temporarily increased and the central control unit connected to the lead 80 may determine the local hardness of the work-piece surface from the signal variation coinciding with the increase in the contact force, in which case it has recourse to comparison values or characteristics on file.

In the same way as the switching circuits associated directly therewith, the above-described scanning head 12 has a very simple construction, so that one obtains a considerable increase in the scanning speed with low expenditure.

In the scanning head illustrated in FIG. 2, parts of the head itself and of the operating electronics, which have already been described above with reference to FIG. 1, again have the same reference numerals.

The probe tip 30 is now located directly on the support arm 20 of the support lever 18 and for determining the force acting on the probe tip 30, the output signal of the position indicator 50 is twice differentiated with respect to time in a double differentiation stage 86 and multiplied by a signal adjustable for example at a resistor 88 (chosen to correspond to the moving mass and the movement transmission or determined in calibrated measurements). The calculated force signal made available at the output of the double differentiation stage 86 is sent to the input of the amplifier 52 and processed as in the embodiment according to FIG. 1.

It is common to both afore-described embodiments that the probe tip 30 is rotationally symmetrical, so that as regards any movements in the x-y-plane, the same contact conditions are present with elevations 84. Even the arrangement and mounting of the support lever 18 is chosen so that the same conditions exist for any choice of the scanning direction in the x-y-plane, in particular in the drawing from left to right or from right to left or from front to back or from back to front. Thus, at the end of a scanning line, one can change over directly to the end of the next scanning line and from there measure back to its beginning. In the case of successive scanning lines, the probe tip 30 does not have to be positioned at the equivalent starting point, it can be proportionately dragged and pushed.

I claim:

1. A scanning head for a machine for measuring the micro-surface contouor of work-pieces which includes a housing (14), a rigid probe tip support (18) mounted (16) to move on the housing (14) and which supports a fine probe tip (30) means (42 to 46) for the resilient biasing of the probe tip (30) against the work-piece surface (10) and a position indicator (50) cooperating with the probe tip support (18), characterized in that a force sensor (34; 50, 86, 88) is provided which measures the force acting on the probe tip (30); and included in the biasing means is a controllable servo motor (44, 46) acting on the probe tip support (18), the output force of which is adjusted (56 to 60) to a constant output signal of the force sensor (34; 50, 86, 88), the probe tip (30) on the probe tip support (18) being shiftable perpendicularly to the reference surface (82) and being supported by way of the force sensor (34) on the probe tip support (18).

2. Scanning head according to claim 1, the probe tip support being a support lever (18) extending substantially parallel to the work-piece surface (10), characterised in that the probe tip (30) is located on a leaf spring (26) extending in parallel below the support lever (18).

3. Scanning head according to claim 2, characterised in that the force sensor (34) is seated with resilient biasing between the probe tip (30) and the support lever (18).

4. Scanning head according to one claim 1, characterised in that the force sensor (34) comprises a solid state sensor.

5. Scanning head according to claim 1, characterised in that the force sensor (34) is connected by way of a lead (38) of low resistance to bending, which even when the probe tip support (18) is fully extended, is predeflected from the neutral axis, to a lead (40) integral with the housing.

6. Scanning head according to claim 1, characterised in that the force sensor (50, 86, 88) comprises a position indicator (50) preferably cooperating with the probe tip support (80) and a double differentiating stage (86) connected thereto.

7. Scanning head according to claim 1, characterised in that the position indicator (50) is a position indicator operating using the Hall effect.

8. Scanning head according to claim 1, characterised by a force/displacement characteristic circuit (74) receiving the output signal of the force sensor (34; 50, 86, 88) and by an adder (78), which receives the output signal of the latter and the output signal of the position indicator (50) cooperating with the probe tip support (18).

9. Scanning head according to claim 8, characterised in that the force/displacement characteristic circuit (74) is exchangeable or contains a plurality of different force/displacement characteristics, of which respectively one can be activated by a selection unit (76).

10. Scanning head according to claim 1, characterised in that the servo motor comprises a permanent magnet (44) connected to the probe tip support (18) and a magnet coil (46) supported by the housing (14).

11. Scanning head according to claim 1, characterised by a reference value switching circuit (62 to 66), which switches over the reference value signal for the servo motor control circuit (56 to 60) between different values.

12. Scanning head according to claim 1, characterised in that the probe tip (30) is symmetrical to its central plane which is perpendicular to the scanning direction, preferably is rotationally symmetrical and its location on the probe tip support (18) as well as the location and mounting (16) of the probe tip support (18) on the housing (14) are chosen so that the relative movement between the probe tip (30) and work-piece surface (10) takes place in the positive and negative scanning direction under the same conditions.

* * * * *